United States Patent
Gunderson et al.

(10) Patent No.: US 7,137,196 B2
(45) Date of Patent: Nov. 21, 2006

(54) METHOD OF MAKING AN ELECTRICAL CONNECTION

(75) Inventors: Neal F. Gunderson, Lake Elmo, MN (US); Frank W. Bernett, Longmont, CO (US); Andrew R. Motzko, Delano, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 10/884,053

(22) Filed: Jul. 2, 2004

(65) Prior Publication Data

US 2006/0002067 A1    Jan. 5, 2006

Related U.S. Application Data

(60) Provisional application No. 60/545,911, filed on Feb. 19, 2004.

(51) Int. Cl.
  *H01R 43/00* (2006.01)
(52) U.S. Cl. .............................. 29/884; 29/874; 29/876
(58) Field of Classification Search .................. 29/825, 29/832, 842, 874, 876, 884
  See application file for complete search history.

(56) References Cited

U.S. PATENT DOCUMENTS

| | | | |
|---|---|---|---|
| 5,194,696 A | 3/1993 | Read | |
| 5,257,941 A | 11/1993 | Lwee | |
| 5,276,577 A | 1/1994 | Brooks | |
| 5,282,099 A | 1/1994 | Kawagoe | |
| 5,357,386 A | 10/1994 | Haidari | |
| 5,392,177 A | 2/1995 | Chainer | |
| 5,459,627 A | 10/1995 | Peter | |
| 5,546,250 A | 8/1996 | Diel | |
| 5,609,496 A | 3/1997 | Kilmer | |
| 5,646,801 A | 7/1997 | Boigenzahn | |
| 5,689,386 A | 11/1997 | Morehouse | |
| 5,691,860 A | 11/1997 | Hoppe | |
| 5,696,648 A | 12/1997 | Jeong | |
| 5,751,514 A | 5/1998 | Hyde | |
| 5,931,697 A | 8/1999 | Jeong | |
| 6,066,000 A * | 5/2000 | Masumoto et al. | ......... 439/607 |
| 6,108,162 A | 8/2000 | Amirkiai | |
| 6,270,375 B1 | 8/2001 | Cox | |
| 6,392,838 B1 | 5/2002 | Hearn | |
| 6,433,956 B1 | 8/2002 | Peters | |

(Continued)

OTHER PUBLICATIONS

STL10747, Frank W. Bernett et al., U.S. Provisional Patent Application entitled, Method and Apparatus For Sealing A Disc Drive Filled With A Low Density Gas, U.S. Appl. No. 60/546,911, filed Feb. 19, 2004.

(Continued)

*Primary Examiner*—Carl J. Arbes
(74) *Attorney, Agent, or Firm*—Shumaker & Sieffert PA

(57) ABSTRACT

An interface to make interconnections between the interior and exterior of a sealed enclosure may include a flat connector (FC). The FC may comprise at least one layer of a substantially planar substrate. Each substrate layer may include metallization for conducting signals between contacts on an interior-facing surface and contacts on an exterior-facing surface. In an enclosure with an aperture for passing electrical conductors, the FC may be configured to seal the aperture to inhibit the escape of a low density gas, such as helium, for a long period of time. In one embodiment, the FC may include metallization configured to minimize helium leakage. As such, the FC may conduct electrical signals into and out of the sealed enclosure. Such signals may include, for example, power, control, and data signals for operating devices housed within the enclosure.

17 Claims, 9 Drawing Sheets

U.S. PATENT DOCUMENTS

| | | |
|---|---|---|
| 6,454,572 B1 | 9/2002 | Konetski |
| 6,482,027 B1 * | 11/2002 | Ishii et al. .................. 439/495 |
| 6,504,685 B1 | 1/2003 | Wachtler |
| 6,519,110 B1 | 2/2003 | Dague |
| 6,525,899 B1 | 2/2003 | Hearn |
| 6,556,372 B1 | 4/2003 | Hearn |
| 6,633,529 B1 | 10/2003 | Yamada |
| 6,680,813 B1 | 1/2004 | Dague |
| 6,721,128 B1 | 4/2004 | Koizumi |
| 6,721,135 B1 | 4/2004 | Hong |
| 6,739,902 B1 * | 5/2004 | Miyazawa et al. .......... 439/495 |

OTHER PUBLICATIONS

Loctite Technical Data Sheet—Hysol® Product E-20NS, Printed May 28, 2004 (3 pages).

* cited by examiner

METHOD OF MAKING AN ELECTRICAL CONNECTION

CLAIM OF PRIORITY

This application claims priority under 35 USC §119(e) to U.S. Patent Application Ser. No. 60/545,911, filed on Feb. 19, 2004. The disclosure of the prior application is incorporated herein by reference in its entirety.

BACKGROUND

Some electrically operated devices, such as data storage devices, are housed in protective enclosures. Some enclosures, also referred to as housings, may be sealed for various reasons, such as to keep out contaminants. Another reason an enclosure may be sealed is to maintain an alternate atmosphere. Some alternate atmospheres may be used to obtain certain performance advantages for some electrical, mechanical, or electro-mechanical devices.

Data storage devices that may be housed in sealed enclosures include disk drives that store data on magnetic or optical disks. For example, a hard disk drive (HDD) may store data on a magnetic disk. An HDD typically includes a base into which various components of the disk drive may be installed. A top cover cooperates with the base to form an enclosure that houses electronic and electro-mechanical components of the disk drive. These components include, for example, a spindle motor, which rotates one or more disks at high speed. Information may be written to and read from tracks on the disks through the use of an actuator assembly. The actuator assembly may include actuator arms, which extend towards the disks, with one or more suspensions or flexures extending from each of the actuator arms. Mounted at the distal end of each of the flexures is a read/write head, which may include an air bearing slider that enables the head to fly in close proximity to the corresponding surface of the associated disk.

The actuator assembly may receive power, control, and data signals through a flexible interconnect called a flex assembly (and may also referred to as a printed circuit cable or flex circuit or wiring harness). A proximal end of the flex assembly may be secured to the actuator arm near the pivot point of the actuator. The head conductors may be soldered, for example, to exposed contacts on the flex assembly. The flex assembly may also route conductors that carry currents to a voice coil motor assembly (VCMA) that may be used to position the actuator arm. Typically, the flex assembly is coupled to a preamplifier drive circuit (preamp) that may generate write currents during a write operation and pre-amplify read back signals during a read operation.

In a sealed HDD, such power, control and data signals may be coupled through a bulkhead connector extending through an aperture in the base. Internally, the bulkhead connector may be electrically coupled to a distal end of the flex assembly. Externally, the bulkhead connector may be electrically coupled to an externally-mounted printed circuit board assembly (PCBA).

SUMMARY

An interface to make interconnections between the interior and exterior of a sealed enclosure may include a flat connector (FC). The FC may comprise at least one layer of a substantially planar substrate. Each substrate layer may include metallization for conducting signals between contacts on an interior-facing surface and contacts on an exterior-facing surface. In an enclosure with an aperture for passing electrical conductors, the FC may be configured to seal the aperture to inhibit the escape of a low density gas, such as helium, for a long period of time. Accordingly, the FC may have a relatively low permeability to the low density gas.

In one embodiment, the FC may include metallization configured to minimize helium leakage. In another embodiment, the FC substrate may be made of a material having a low permeability to helium. The FC may also sealably encompass the aperture in a sealed enclosure to provide a bulkhead electrical interface that may inhibit the escape of a gaseous medium. As such, the FC may conduct electrical signals into and out of the sealed enclosure. Such signals may include, for example, power, control, and data signals for operating devices housed within the enclosure.

In one embodiment, the FC may sealably encompass the aperture by soldering a metallized peripheral ring on one layer of the FC to a surface of the enclosure. In a different embodiment, the FC may be adhesively bonded to the wall of the enclosure using, for example, a metal-filled epoxy.

Certain embodiments may provide an apparatus or a method with one or more of the following advantages. For example, the FC may present a low profile that is compatible with certain assembly operations that use robotic tooling. In addition, the FC may make the assembly of an apparatus with a sealed enclosure simpler and faster. Moreover, because the FC may have a low profile, other components, such as an environmental control module, may be assembled into the sealed enclosure. Furthermore, the interconnects to the FC may be configured to exhibit low cross-talk as well as reduced susceptibility to various sources of electromagnetic interference (EMI).

The details of one or more embodiments are set forth in the accompanying drawings and the description below. Other features, objects, and advantages will be apparent from the description and drawings, and from the claims.

DESCRIPTION OF DRAWINGS

Like reference symbols in the various drawings indicate like elements.

DETAILED DESCRIPTION

Figure 1:
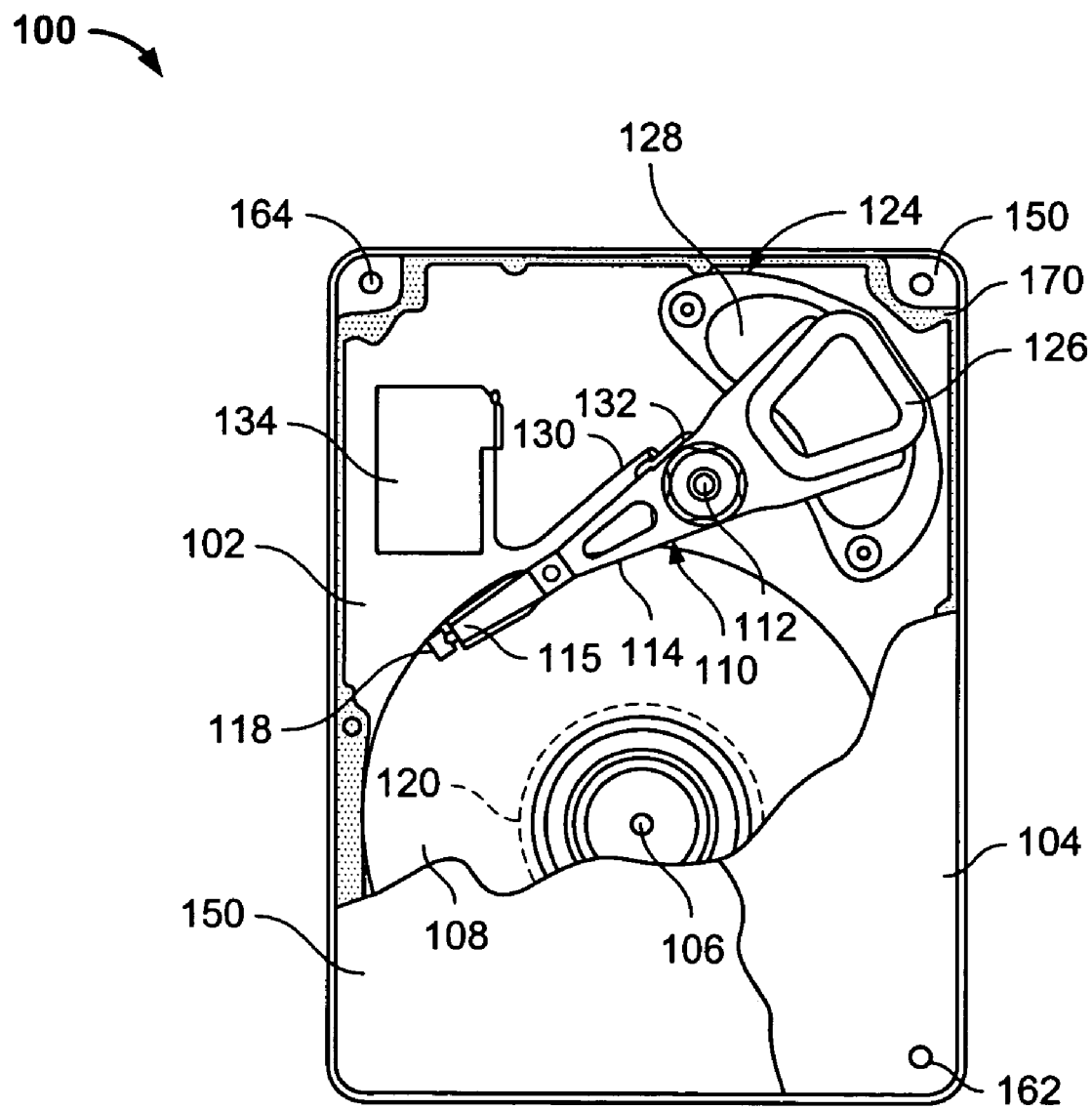
FIG. 1 is a plan view of an exemplary hard disk drive (HDD) in an enclosure.

A flat connector (FC) may be used to pass electrical signals through an aperture in an enclosure while sealably encompassing the aperture to inhibit the escape of a low density gas, such as helium, for a long period of time. Such an FC provides a cost-effective solution for passing electrical signals through, for example, an aperture in an electrically conductive, environmentally-sealed enclosure. One exemplary application for an FC is as a bulkhead connector in an environmentally-sealed data storage device. In one example, the sealed data storage device includes a helium-filled hard disk drive (HDD). Although helium-filled HDDs are described herein in various examples, these examples are merely illustrative and not intended to be limiting. The methods and devices may be applied to a wide range of electronic, electrical, mechanical, and electro-mechanical applications for which environmental sealing is desired. By way of example, such devices and applications may include computer systems, servers, computer peripheral devices, avionics, industrial controllers, and military electronics.

Filling disk drives with low density gasses, other than air, may enhance certain drive performance characteristics. For example, a low density gas, such as helium, may reduce the aerodynamic drag experienced by the spinning disks within the drive. One benefit of this may include reduced power requirements for the spindle motor. Thus, a helium-filled drive may require substantially less power than a comparable, air-filled disk drive. Moreover, reduced drag forces within the helium-filled drive may also correspond to aerodynamic turbulence experienced by the drive components, such as the actuator arms, the suspensions, and the heads.

Other benefits may accrue to some helium-filled HDDs. The reduced power requirements and "air" turbulence may allow helium-filled drives to operate at higher speeds than equivalent air-filled drives (i.e., at the same percentage of read/write errors). Because there may be less turbulence within the helium-filled drive, the heads may fly closer to the disk surface. As a result, helium-filled drives may also enable higher storage capacities (i.e., higher recording densities).

Despite the potential advantages of helium-filled drives, such drives have not been widely used. One reason for this may relate to maintaining the helium (or other low density gas) atmosphere within the enclosure for the service life of the drive. If helium leaks out of the enclosure and is replaced by air, the performance advantages associated with the helium atmosphere may be lost and may lead also to premature drive failure. For example, the increased concentration of air may lead to increased turbulent forces on the drive heads due to the increased drag forces within the drive. This may cause the heads to fly too far away from the disk, thereby increasing the rate of read/write errors.

One way to retain the advantages of a low density atmosphere in a disk drive is to hermetically seal the drive enclosure. One challenge with hermetically sealing a disk drive enclosure relates to the cost of hermetically sealing the bulkhead connector. The bulkhead connector passes electrical signals (e.g., power, control, and data) through a wall of the enclosure.

For purposes of illustration, the use of an FC to form a bulkhead electrical interface will be described in the exemplary context of a helium-filled HDD. An exemplary HDD will first be introduced in FIG. 1. Next, methods of hermetically sealing the HDD to maintain a helium atmosphere enclosure are described. Then, exemplary configurations for mounting an FC to an HDD enclosure are described. After that, the details of the FC and a flex spring that may be used to make connection to the FC are explained. Finally, use of FCs in two exemplary applications, including a laptop computer and a client-server system, are described.

By way of introduction, an exemplary HDD 100 is shown in FIG. 1. The HDD 100 includes a sealed enclosure to house components within the HDD 100. The HDD 100 includes a base 102 to which various components of the disk drive 100 are mounted. A structural cover 104, shown partially cut away, cooperates with the base 102 to form a housing that defines an internal environment for the HDD. The HDD components include a spindle motor 106 that rotates one or more disks 108 at a high speed. An actuator assembly 110 writes and reads from tracks on an associated disk 108. The actuator assembly 110 rotates during a seek operation about a bearing shaft assembly 112 positioned adjacent the disks 108. The actuator assembly 110 includes one or more actuator arms 114. Each actuator arm 114 extends toward the associated disk 108. One or more flexures 115 extend from each of the actuator arms 114. Near the distal end of each of the flexures 115 is a head 118, which includes a slider that enables the head 118 to fly in close proximity above the corresponding surface of the associated disk 108.

During a seek operation, a voice coil motor 124 controls the track position of the heads 118. The voice coil motor 124 typically includes a coil 126 attached to the actuator assembly 110, as well as one or more permanent magnets 128. As the coil 126 moves, the actuator assembly 110 pivots about the bearing shaft assembly 112, the heads 118 move across the surfaces of the disks 108.

A flex assembly 130 provides electrical connection paths for the actuator assembly 110 while allowing pivotal movement of the actuator assembly 110 during operation. The flex assembly 130 includes a flex circuit 132 to which head wires (not shown) are connected. The head wires are routed along the actuator arms 114 and the flexures 115 to the heads 118. The flex circuit 132 typically includes circuitry for controlling the write currents applied to the heads 118 during a write operation, and a preamplifier for amplifying read signals generated by the heads 118 during a read operation. The flex assembly 130 is held in place by a flex bracket 134. The flex assembly provides communication through the base 102 to a disk drive printed circuit board assembly (PCB assembly) 630 shown in FIG. 6B. The PCB assembly 630 is mounted to the bottom side of the HDD 100, and sends and receives signals for operating the HDD 100.

The HDD 100 may be configured to operate in a helium-filled atmosphere within its enclosure. While it is possible to provide internal helium reservoirs or other systems for periodically refilling the HDD 100 with helium, a different solution to the problem of sealing enclosures is to provide a long-lasting hermetic seal that substantially maintains the helium environment during the service life of the HDD 100.

The examples described herein may illustrate such a hermetic seal through the use of a sealing cover 150. In one example, the sealing cover 150 may be welded or brazed to the base 102 or to the structural cover 104. In another example, a bottom cover may first be adhesively bonded to seal any leakage paths in the bottom of the base 102. Then, the sealing cover 150 may be sealably bonded, by welding or adhesive bonding, to the bottom cover to seal any leakage paths in the top of the base 102. In the latter example, the bottom cover and the sealing cover 150 may provide, in effect, a conductive skin that sealably envelops the base, except for an aperture for making electrical connection to the bulkhead connector.

Figure 2:
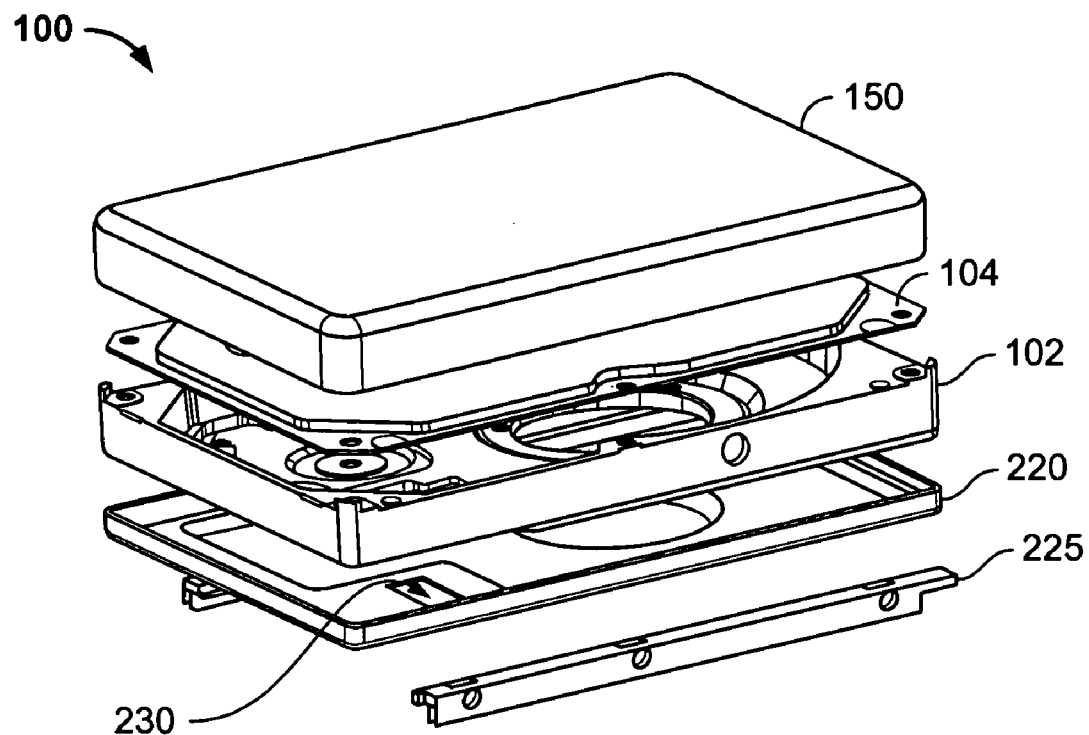
FIG. 2 is an exploded view of a sealable HDD enclosure.
Figure 3:
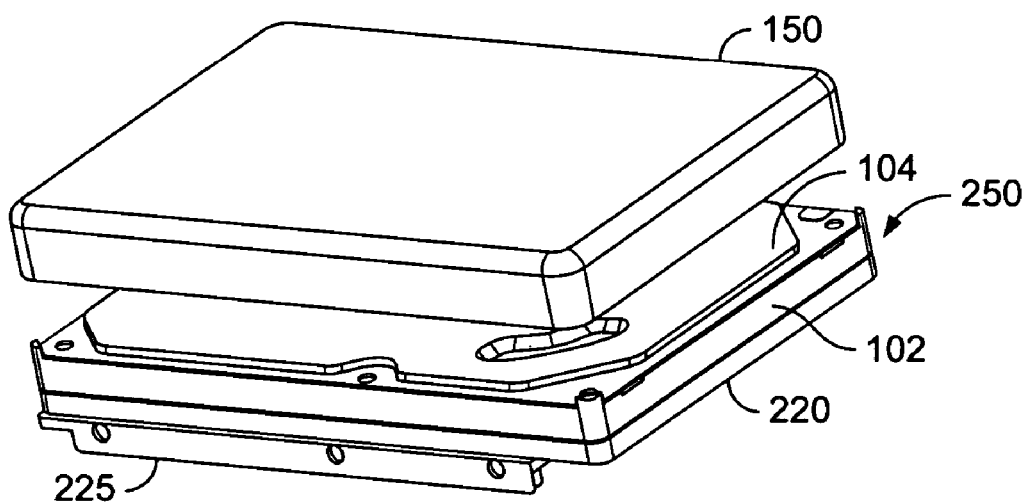
FIG. 3 is an exploded view of a partially assembled sealable HDD enclosure.

FIGS. 2–3 illustrate one embodiment in which the HDD 100 may be hermetically sealed to permit long term operation in a helium environment. The use of the sealing cover 150 in combination with the structural cover 104 may provide the requisite degree of sealing necessary to control the leakage of helium during the service lifetime of the HDD 100. FIGS. 2–3 show one example of hermetically sealing the HDD 100. Other examples are described in U.S. Provisional Patent Application No. 60/546,911, entitled "Method and Apparatus for Sealing a Disc Drive with a Low Density Gas," which was filed on Feb. 19, 2004, the contents of which are incorporated herein by reference.

FIG. 2 illustrates an embodiment of an enclosure for the HDD 100. The enclosure includes the base 102, the structural cover 104, the sealing cover 150, a bottom cover 220, and optionally, mounting rails 225. In some examples, the base 102, the structural cover 104, the bottom cover 220, and the sealing cover 150, may be made of conductive metals, such as aluminum or stainless steel. Such metals have a low permeability to low density gasses, such as helium. As such, conductive metals that have low permeability to low density gasses, for example, may be suitable for maintaining the atmosphere within the enclosure.

The sealing cover 150 may be a thin-walled metal cover having a flat top surface and downward-depending sides. In some examples, the sealing cover 150 may be formed of aluminum or brass. For example, a low-profile sealing cover 150 may be formed of aluminum or brass having a thickness of approximately 0.010 inches. Such materials are characterized by a low permeability to helium or other low density gasses. In other examples, the sealing cover 150 may be formed of other materials, such as stainless steel, that are characterized by low permeability to helium.

To provide for reworkability during manufacturing and to also provide for a long-term hermetic seal, the HDD 100 may first be temporarily sealed and then be permanently sealed. The temporary seal permits rework to be readily performed if necessary. The bottom cover 220 and the structural cover 104 provide a temporary seal that maintains the helium atmosphere long enough to conduct certification testing (e.g., 1–10 days). The bottom cover 220 may be welded or adhesively bonded to the base 102. Prior to screwing the cover 104 to the base 102, a seal 170 (FIG. 1) may be placed so that the seal engages the bottom surface of the cover 104 to provide a temporary seal for the HDD 100. The seal 170 may be relatively impervious to the passage of helium (or other low density gas). During the certification test period, the seal 170 should be sufficiently impervious to helium so that HDD 100 retains an effective amount of helium for operation. A suitable gasket material for the seal 170 is manufactured by Zeon Chemical L.P. of Louisville, Ky., and has a permeation rate of less than $10 \times 10^{-8}$ centimeters squared per second×atmosphere ("cm^2/sec*atm"). In one example, the seal 170 may have a leak rate of less than $5 \times 10^{-7}$ cc/sec of helium for a disk drive having an internal volume of approximately 100 cc (cubic centimeters).

The structural cover 104 may, in some examples, include a valve (not shown) for filling the HDD 100 with a low density gas, such as helium. In another example, the HDD 100 may receive a sealing cover 150 without a structural cover 104. In that case, the sealing cover 150 may be sealably attached to the HDD 100 in an appropriate environment, such as a helium environment.

According to the embodiment shown in FIG. 3, the sealing cover 150 may be attached to the HDD 100 by, for example, a weld around the perimeter of the base 102. Thus, the sealing cover 150 may create a hermetic seal that may maintain effective concentrations of helium (or other low density gasses) within the HDD 100 over the service life of the drive. For instance, experiments have shown that disk drives constructed as described above may leak helium at such a low rate that it could take over 50 years for the helium concentration to drop below a predetermined lower limit believed to be effective for obtaining the advantages of a helium-filled drive.

The base 102 and the bottom cover 220 each have an aperture 230 through which electrical signals pass between the exterior and interior of the enclosure. For example, the PCB assembly 630 (see FIG. 6B) that is mounted below the enclosure may send and receive power, control, and data signals to operate the HDD 100. Accordingly, the aperture 230 must also be hermetically sealed if the HDD 100 is to maintain, for example, the helium atmosphere.

Figure 4A:
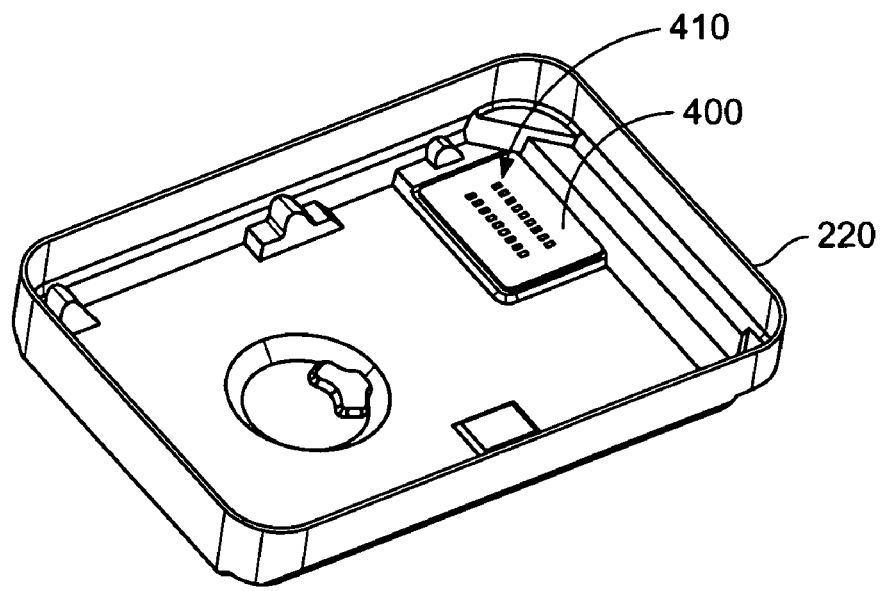
FIGS. 4A–4B are perspective views of a flat connector (FC) mounted to an interior surface of the HDD enclosure of FIG. 2.
Figure 4B:
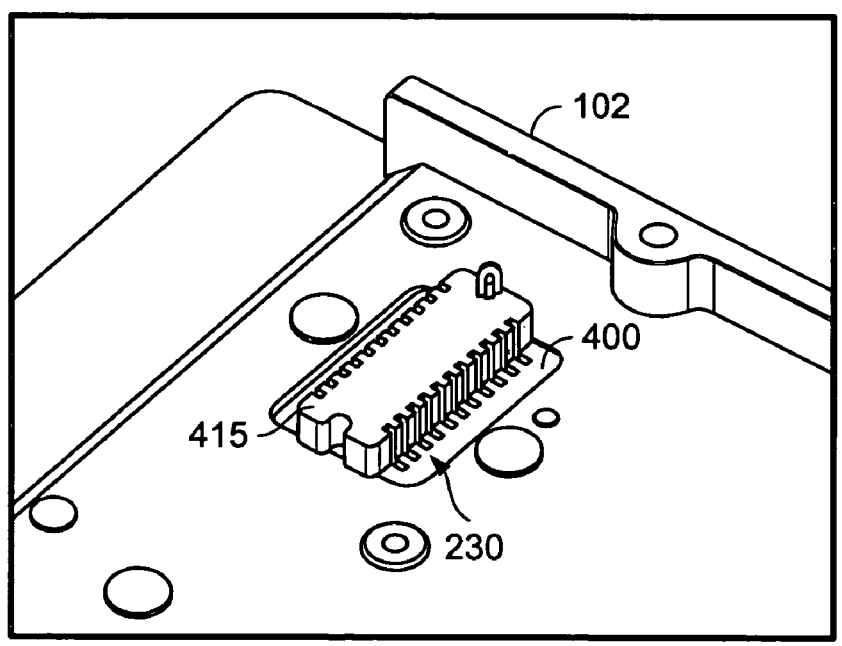

A new system that provides an electrical interface for hermetically sealed enclosures is shown in FIGS. 4A–4B. The new system includes a flat connector (FC) 400 having on opposite sides metallized pads for making contact to conductors as will be described below. As will be described, the FC 400 may be sealably mounted to a surface of the bottom cover 220 or the base 102 such that the aperture 230 may be hermetically sealed with respect to a low-density gas such as helium.

The FC 400, in one example, is similar to a circuit board having multiple metallization layers. The FC 400 does not use spring-finger type contacts to conduct power, data, and control signals. Using low noise PCB design techniques, (e.g., loop area minimization, separating noisy traces from high impedance trances, etc.), traces on the FC 400 may be configured to minimize antenna structures that could contribute to cross-talk between signal conductors. Such cross-talk may increase the likelihood of read/write errors. As such, the FC 400 provides a low-profile design in which signal cross-talk and susceptibility to electromagnetic interference (EMI) and electrostatic discharge (ESD) may be minimized.

Moreover, the low-profile of the FC 400 is compatible with some robotic tooling that may be used during the assembly process, for example, to assemble the head disk assembly (HDA). Furthermore, the low-profile of the FC 400 may enable additional components to be assembled into the HDD 100. For example, an environmental control module (ECM) may be installed in the region around the FC 400 to improve the atmospheric conditions within the sealed enclosure 200.

In FIG. 4A, the FC 400 is sealably attached to the interior surface of the bottom cover 220. In some examples, the FC is adhesively bonded to a wall of the enclosure using a bonding adhesive that has a low permeability to gasses, such as helium and ambient air. This low permeability specification may apply to gasses that the adhesive seal is intended to prevent ingress into, or egress from, the enclosure. The adhesive may be a liquid or film epoxy filled with conductive particles for grounding to the enclosure and to reduce permeation. One such adhesive is commercially available from 3M Corp. of St. Paul, Minn. under the trade name 3M™ Z-Axis® Adhesive Film. One exemplary low permeability epoxy is commercially available from Henkel Loctite Corp. of Rocky Hill, Conn. under the trade name Hysol® E-20NS. In one embodiment, this medium viscosity epoxy may cure at room temperature in a relatively short time (about 20 minutes) and thus can be used without any special heating or cooling equipment. Another exemplary epoxy is commercially available from 3M Corp. of St. Paul, Minn. under the trade name 3M™ Scoth-Weld™ Epoxy Adhesive DP 460EG.

The seal may be formed around the periphery of the FC 400 so as to encompass the aperture 230 (not shown). In one example, the FC 400 is adhesively bonded to the interior surface of the bottom cover 220. In another example, the FC 400 may be soldered or brazed to the interior surface of the bottom cover 220. In one example, solder paste is applied to a peripheral exposed metal ring 720 (as will be described in FIG. 7A), and the ring with the solder paste is positioned to encompass the aperture 230. In another example, a ring of solder is placed in a groove or between the FC and the base recess.

The enclosure and FC 400 may be soldered using, for example, a reflow process such as may be performed in a vacuum or a neutral atmosphere reflow oven. The peripheral metal ring 720 may be plated to facilitate soldering to the base 102 or to the bottom cover 220. In one example, the peripheral metal ring and/or the base 102 may be nickel-plated. In one embodiment, tin plating may be used in addition to nickel plating.

In one example, the peripheral metal ring 720 may be configured to be electrically coupled to one or more traces on the FCC 400 in order to enhance, for example, EMI and ESD protection by providing a conductive path to the metal enclosure.

The FC 400 includes exposed metal pads (i.e., electrical contacts) to which electrical connection may be made. The FC 400 includes a number of exposed metal pads 410 on the interior facing side. These interior facing pads 410 may be used to make connection to the flex assembly 130.

In FIG. 4B, an exemplary surface-mount style connector 415 is soldered to pads 410 on the FC 400. In this example, the FC 400 is mounted to an interior surface of the base 102. The connector 415 may be used to make connection, for example, to the printed circuit board assembly 630 (FIG. 6B).

Figure 5A:
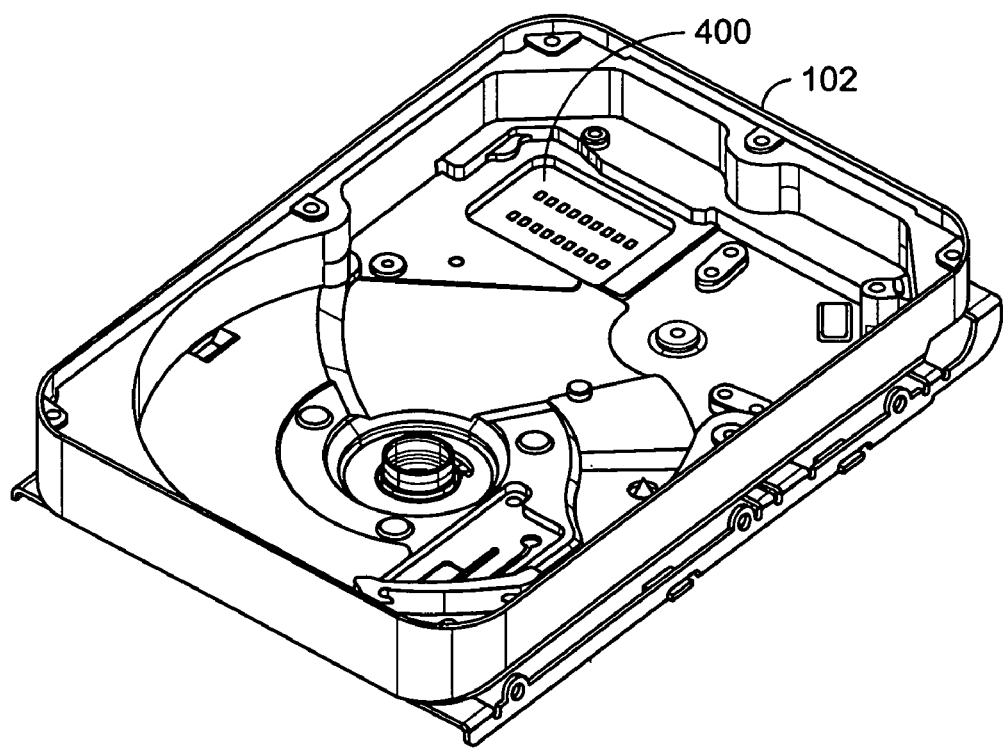
FIG. 5A–5B are perspective views of an FC mounted to an exterior surface of an HDD enclosure of FIG. 2.

In FIG. 5A, the FC 400 is sealably attached to an exterior surface of the base 102. This configuration may provide a lower height profile in the interior of the base 102 for the connection to the flex assembly 130. The FC 400 may be, for example, adhesively bonded or soldered, as described above, to the base 102.

Figure 5B:
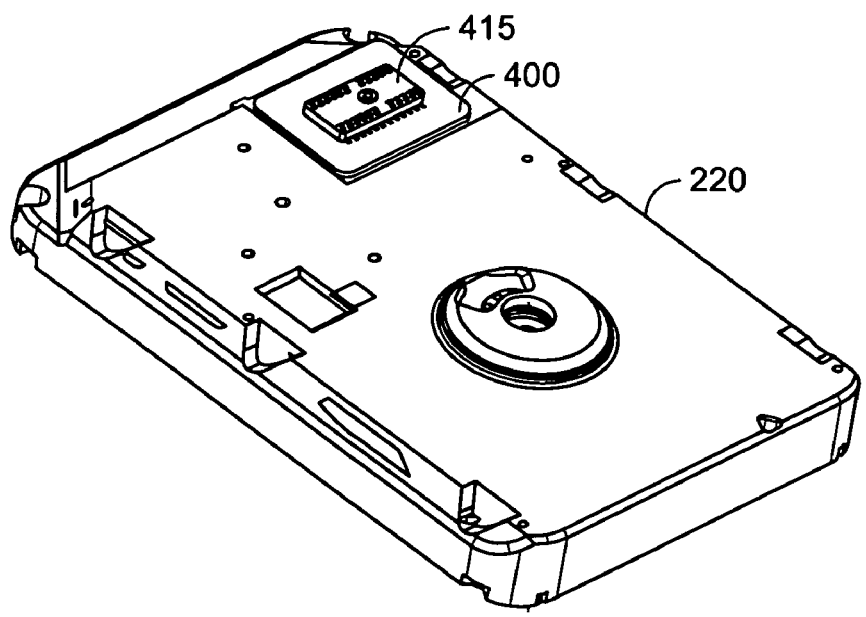

In FIG. 5B, the FC 400 is sealably attached to the bottom cover 220. In this example, the connector 415 has been soldered to the FC 400 such that connection may be made to, for example, the PCB assembly 630 (FIG. 6B). In this example, the pads 410 on the interior facing side of the FC 400 (not shown) are accessible to the flex assembly 130 through the aperture 230 in the bottom cover 220 and the base 102.

Figure 6A:
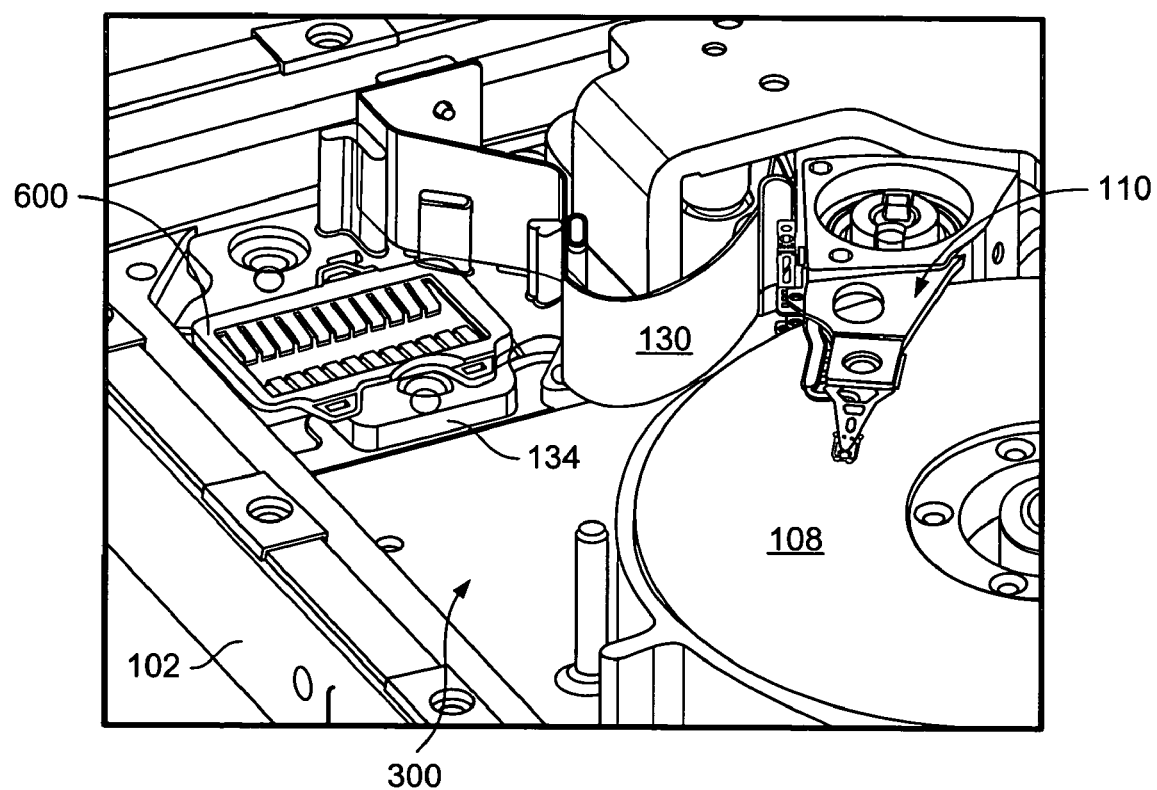
FIG. 6A is a perspective view of an FC installed in the base of an HDD.
Figure 6B:
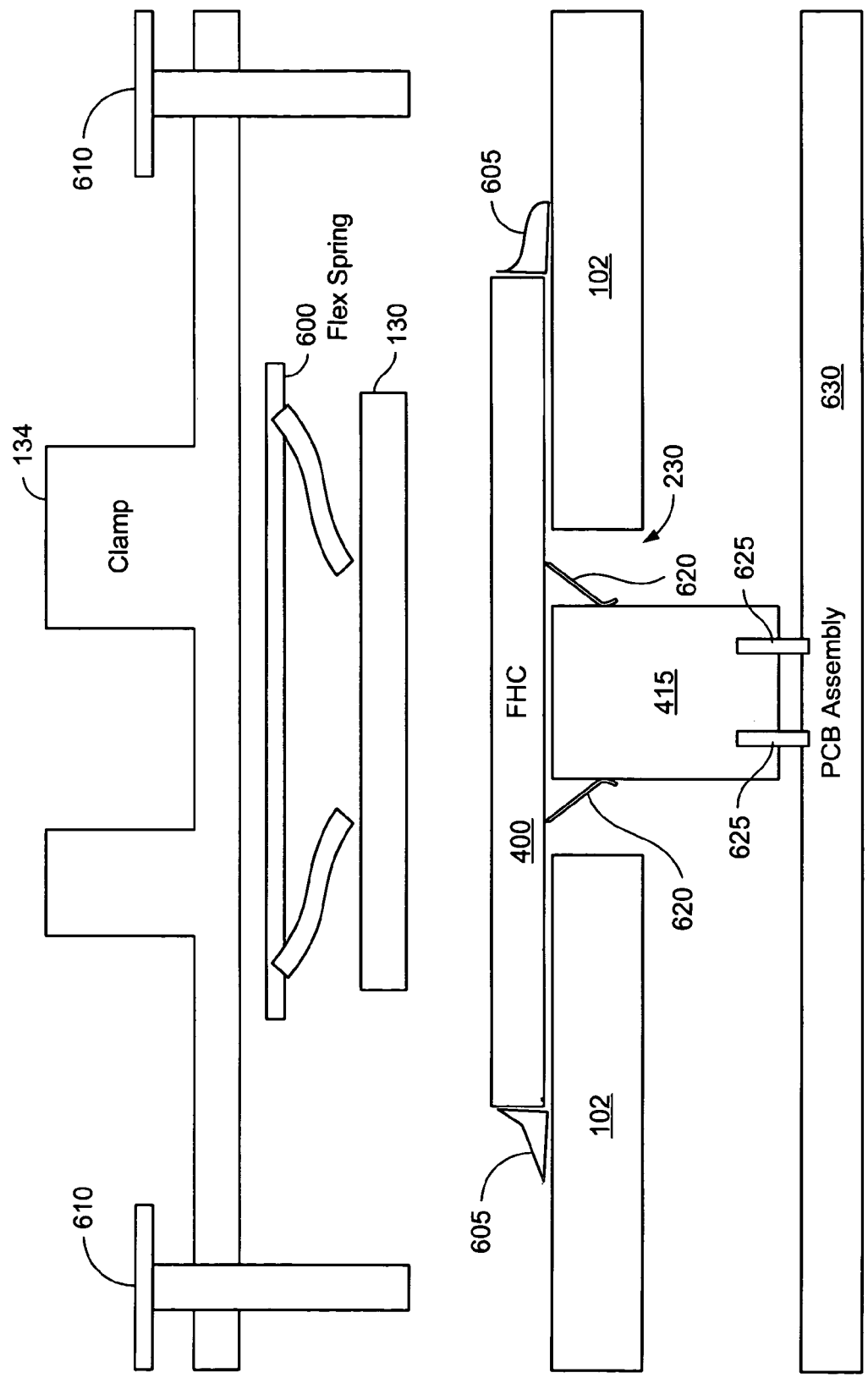
FIG. 6B is an exploded side cross-section view of the FC installation of FIG. 6A.

In FIG. 6A, the disks 108, the actuator assembly 110, and the flex assembly 130 have been assembled into the interior region 300 of the base 102. One end of the flex assembly 130 is coupled to the actuator assembly 110. The other end of the flex assembly 130 is coupled to the FC 400 (not shown). A flex spring 600 provides a compression force to the flex assembly 130 to make electrical contact between contacts on the flex assembly 130 and corresponding pads of the FC 400. The flex spring 600 is held under compression by the flex bracket 134, which is mounted to the base 102.

In FIG. 6B, an exploded cross sectional view of the installation of FIG. 6A is illustrated. The aperture 230 in the base 102 is, in this example, sealed by the FC 400. The FC 400, in this example, is bonded to the interior surface of the base 102. The bond 605 may be either an adhesive bond, or a soldered joint to a peripheral metallized ring 720 (see FIG. 7A). When assembled, the flex spring 600 applies a load to the non-conductive, interior facing surface of the flex assembly 130. The flex spring 600 compresses the exterior facing surface of the flex assembly 130 against the interior facing surface of the FC 400. The flex assembly 130 is positioned, at least in part, by the flex bracket 134 such that exposed metal pads of the flex assembly 130 (i.e., contacts) are aligned with corresponding contacts on the interior facing surface of the FC 400. When compressed by the flex bracket (also referred to as the flex clamp) 134, electrical contact is made between corresponding contacts on the flex assembly 130 and the FC 400.

The flex spring 100 is held in compression by the flex bracket 134. In this example, the flex bracket 134 is mounted to the base 102 using mounting hardware 610. The mounting hardware 610 may include screws, rivets, snap features, and the like.

In this configuration, the flex bracket 134, the flex spring 600, and the flex assembly 130 provide structural support to the FC 400 to counteract the opposing load force from the connector 415. As such, the bonds 605 do not bear the entire load of maintaining the FC 400 in position over the aperture 230. This reduces the requirements, in some examples, for the bond 605 to have adequate strength to support the load on the FC 400 from the connector 415.

The connector 415 makes electrical connection to pads on the exterior facing surface of the FC 400. The connector may be, for example, a surface-mount style connector, or any other board-to-board or board-to-wire electrical connector suitable for making contact to the exposed metal pads of the FC 400. In this example, the connector 415 has surface-mount leads 620 that may be soldered to the pads on the FC 400. The connector 415 may make connection to the PCB assembly 630 by receiving header pins 625 coupled to the PCB assembly 630. In another example, the connector 415 may be electrically coupled to the PCB assembly 630 using, for example, spring type contacts. Other electrical interconnects may be used between the FC 400 and the PCB assembly 630, such as a ribbon cable, a compliant conductor, or a flex circuit (also referred to as a flex assembly).

As used herein, an electrical connection refers to a direct connection between conductive materials. For example, an electrical connection may be made when a copper conductor is brought into direct physical contact with an exposed conductive pad on a circuit board. A contact refers to an exposed conductive surface to which electrical connection may be made. An off-board conductor may be soldered (or otherwise connected to) a contact on a PCB. Each contact on the PCB is typically coupled, through vias or traces, to at least one other contact on the PCB. Thus, contacts on PCBs may be used to facilitate the making of electrical connections between two or more off-board conductors.

Various connector systems may be used to make electrical connection with the contacts, or pads, of the FC 400. For example, pins may be applied to make electrical contact to the exposed conductive pads on the FC 400. In other examples, pads on the FC 400 may be directly soldered to board-to-board or board-to-wire cable assemblies using, for example, surface-mount connectors or wire harnesses, respectively. In addition, the exposed pads on the FC 400 may be made into any suitable shape or configuration to sufficiently encompass the aperture to provide for sealably attaching the FC 400 to a wall of the enclosure.

Figure 7A:
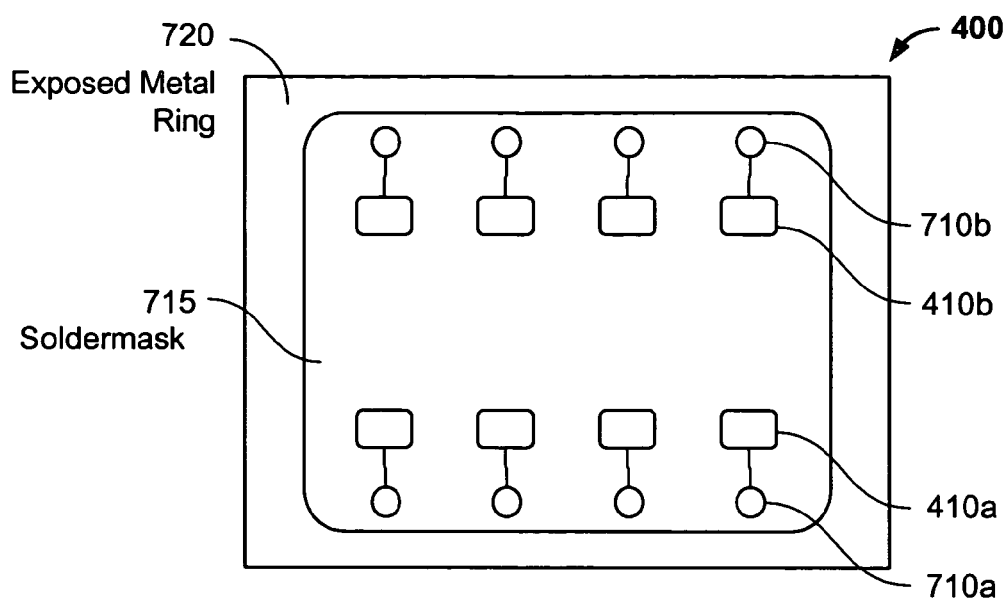
FIGS. 7A–7C are views of the metallization layers of the FC.
Figure 7B:
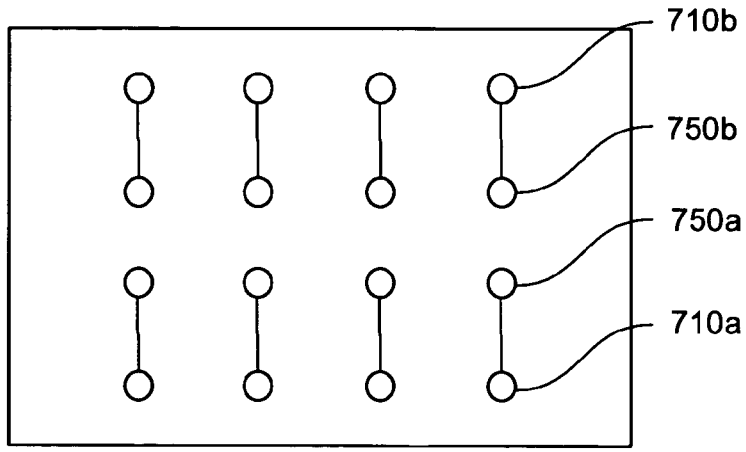
Figure 7C:
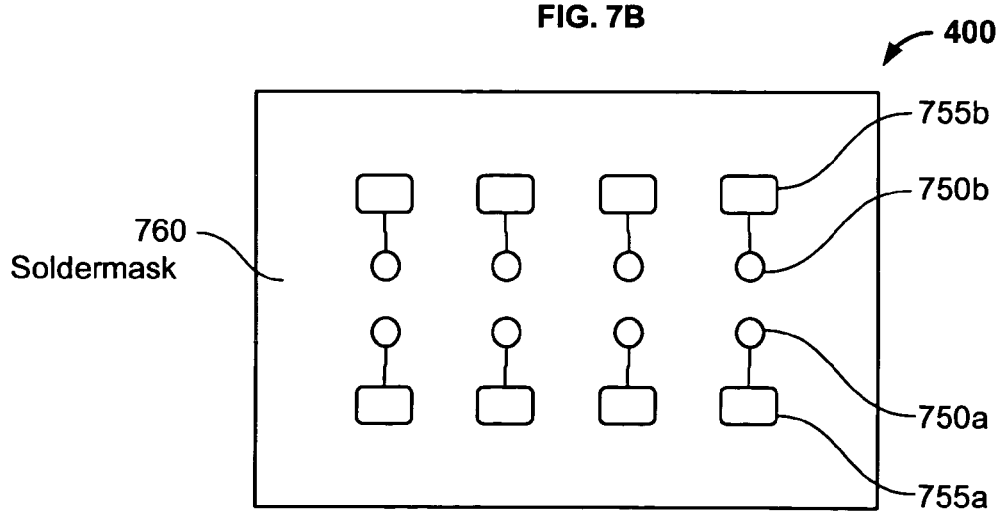

In FIGS. 7A–7C, exemplary metallization layers of the FC 400 are illustrated. In one example, the FC 400 may be made from conventional printed circuit board (PCB) materials (e.g., FR4 or polyimide), and constructed using conventional PCB design techniques and manufacturing methods.

In one embodiment, a thick film ceramic process may be used to make the FC 400. For example, a thick film ceramic process may be used to construct an FC 400 having two metallization layers on at least one layer of a substrate using, for example, a thick film ceramic process. In this example, one sheet of a planar substrate, such as a ceramic, may be sized and shaped to encompass the aperture. In one example, vias may be drilled into the substrate. Metallization may be added to opposing surfaces of each substrate and to the vias to form conductive paths, or signal traces, to make electrical connection between pads (i.e., contacts) formed on the opposing surfaces. In one embodiment, the vias are filled with a conductive metal such that no pin holes are present that would allow a gas to leak through the vias.

In another embodiment, a low temperature co-fired ceramic (LTCC) process may be used to make the FC 400. For example, an LTCC process may be used to construct an FC 400 having three metallization layers on at least two layers of substrate using, for example, the LTCC process. In this example, two sheets of a planar substrate, such as a ceramic, may be sized and shaped to encompass the aperture. In one example, vias are drilled into each substrate according, for example, to the patterns depicted in FIGS. 7A–7C. Metallization may be added to opposing surfaces of each substrate and to the vias to form conductive paths, or signal traces, in accordance with FIGS. 7A–7C. The two sheets may then by overlaid and fused together using, for example, a laminating and a sintering process. During the LTCC process, corresponding traces on the two sheets may be brought together to provide electrical connection between corresponding traces on adjacent surfaces of the two sheets. In another example, the LTCC process may be used to produce an FC 400 that has four or more metallization layers.

In FIG. 7A, the metallization layer includes a number of pads 410a, 410b. The pads 410b are coupled to a corresponding number of vias 710b. The pads 410a are coupled to a corresponding number of vias 710a.

FIG. 7B represents an intermediate layer of the FC 400. This intermediate layer connects each of the vias 710b to a corresponding via 750b. The vias 710a are coupled to a corresponding number of vias 750a.

FIG. 7C shows a metallization layer for an external layer opposite that of the layer shown in FIG. 7A. This external layer includes vias 750b coupled to a corresponding number of pads 755b. It also includes the vias 750a coupled to a corresponding number of pads 755a.

FIGS. 7A–7C represent an exemplary FC 400 that incorporates blind and buried vias. Accordingly, the vias 710a, 710b are coupled only to the layers shown in FIGS. 7A and 7B of this example. Similarly, the vias 750a, 750b are coupled only to the layers shown in FIGS. 7B and 7C. In this configuration, a pin hole leak in the barrel of any of the vias will not, by itself, provide an opening through which helium may leak out of the sealed HDD 100. Because the vias 755a, 755b are off-set from the vias 710a, 710b, electrical connection may be made between the pads 410a, 410b to the pads 755a, 755b.

To further reduce the permeability of the FC 400 to helium, for example, the metallization layers may include "ground fill" areas in which metallization, such as copper, is added to substantially all uncommitted areas of a metallization layer. Ground fill metallization may be added, for example, to surround traces, pads, and vias. Trace-to-trace spacing may be maintained at, for example, 0.010" or less. As such, the "ground fill" metallization may further lower the permeability of the FC 400 to gasses, such as helium. In examples in which the substrate material, such as ceramic, has very low permeability to helium, such "ground fill" may be optional.

The FC 400 may be mounted to a surface of the enclosure by soldering an exposed metal ring 720 to the enclosure wall. In this example, a metallized ring 720 is not covered by a solder mask 715. No soldermask or other dielectric is placed over the peripheral exposed ring 720. As described above, the FC 400 may be soldered to a surface of the sealed enclosure by, for example, applying solder paste to the exposed peripheral ring 720. To aid in the soldering, soldermask 715 may be provided to confine the molten solder to the peripheral ring 720. On the opposite external layer shown in FIG. 7C, solder mask 760 may be applied to substantially the entire surface except for the exposed metal pads, according to standard PCB design methods.

Figure 8A:
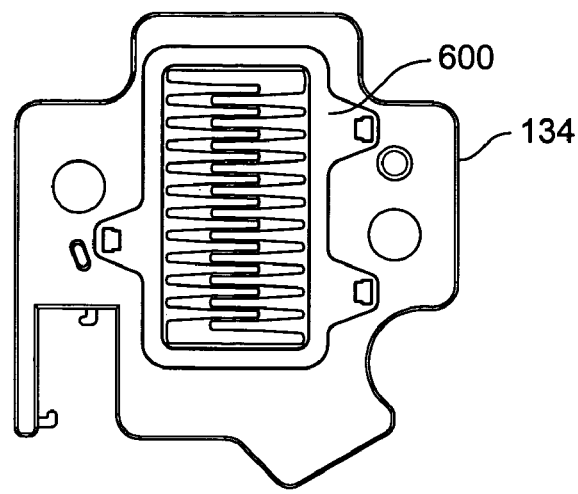
FIG. 8A–8C is a flex spring used in the FC installation of FIGS. 6A–6B.

In FIG. 8A, the flex bracket 134 is assembled with the flex spring 600. In this example, the flex spring 600 includes a generally rectangular peripheral frame that supports a plurality of spring-fingers. Around the peripheral frame, in this example, are three side tabs that have openings therein which may be used to locate the flex spring 600 on locator features formed in the flex bracket 134. The flex spring 600 includes a number of fingers interlaced from opposing lateral edges of the peripheral frame.

The flex spring 600 may be made, for example, of plastic or metal. For example, the flex spring may be formed of aluminum, stainless steel, platinum, silver, copper, beryllium copper, and combinations of these and other metals suitable for use in a spring. The flex spring 600 may be made from conventional processes for making springs, some of which may involve stamping, pressing, forging, baking (i.e., for stress relief), or die cutting.

The flex bracket 134 may be made of plastics, polymers, metals, and the like. For example, the bracket 134 may be made using conventional processes for making a bracket, some of which may involve stamping, forging, die casting, machining, drilling, or injection molding.

When the flex bracket 134 is mounted with the flex spring 600 into the base 102, the spring-fingers of this example provide a distributed load to a non-conductive surface of the flex assembly 130. As such, the flex spring 600 is not in the path of the circuit formed by the conductors carrying signals on the flex assembly 130. Because the flex spring 600 does not carry current signals, the flex spring 600 does not contribute significantly to, for example, cross-talk between signals carried by conductors that pass through the FC 400. Moreover, because the flex spring 600 is electrically isolated from the conductors in the flex assembly 130, the flex spring 600 is unlikely to introduce ESD currents into the circuits coupled to the flex assembly 130 or the FC 400.

Figure 8B:
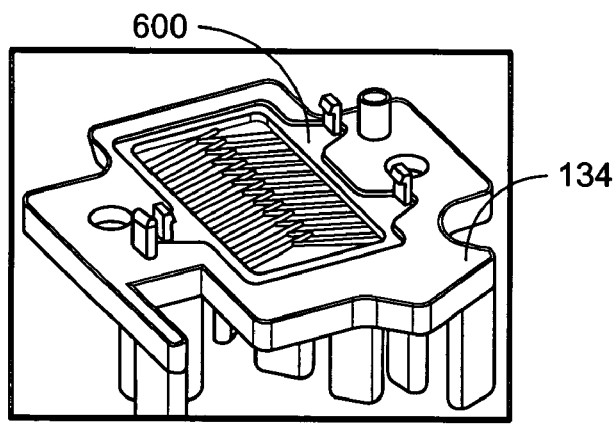

FIG. 8B is a perspective view of the flex spring 600 and flex bracket 134 of FIG. 8A. In this example, the flex spring 600 fingers are raised toward the central axis of the flex spring 600. In other examples, any practical number of fingers may be incorporated into the flex spring 600 so as to provide a desired distribution of compressive forces to the non-conductive surface of the flex assembly 130. The angles, curvature, placement, and number of fingers, as well as other factors, may be reconfigured to optimize the compressive load applied to make electrical connection between contacts on the flex assembly 130 and the corresponding contacts of the FC 400.

In this example, the flex bracket 134 includes a recessed pocket for receiving the peripheral frame of the flex spring 600. This pocket allows the flex bracket 134 to control the lateral position of the flex spring, and aligns the flex spring 600 relative to the flex bracket 134. In one example, the compressive load applied by the fingers of the flex spring 600 to the flex assembly may be a function of the depth of the pocket in the flex bracket.

Figure 8C:
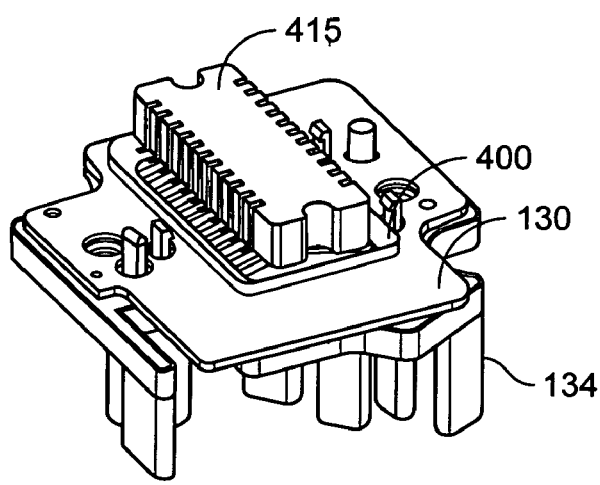

In FIG. 8C, a partial perspective view shows additional detail about how electrical connection is made using the FC 400. In this example, the bracket 134 supports the flex spring 600 (not shown). The flex spring 600 provides a compressive force to a non-conductive surface of the flex assembly 130. An opposing surface of the flex assembly 130 includes contacts that are positioned to make electrical connection to corresponding contacts on an interior facing corresponding surface of the FC 400. On an exterior-facing opposite surface of the FC 400, a set of contacts makes electrical connection to, in this example, leads of the connector 415. In this example, various locating features are provided on the flex bracket 134 for positioning the flex spring 600 and the flex assembly 130. These features may also provide snap-fit functionality for locating the flex bracket 134 relative to the base 102.

Figure 9A:
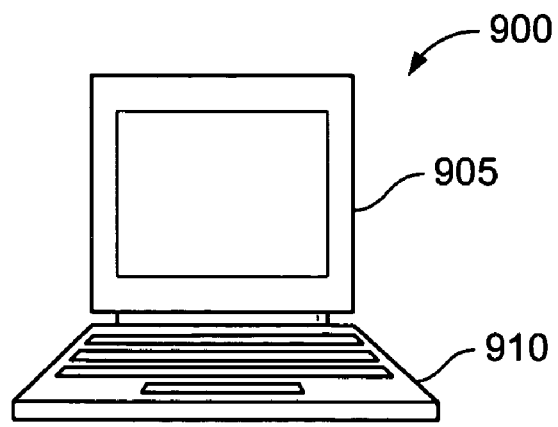
FIGS. 9A–9B are front views of exemplary applications, namely a laptop computer and a client-server system that may use a flex spring to make electrical connection to an FC in a sealed enclosure sealed.

According to some of the above-described embodiments, one or more FCs 400 may be used to provide sealed electrical interfaces, or a bulkhead interconnects, in various applications. In addition to the above-mentioned applications, the FC may be used to seal apertures and provide an electrical interface in enclosures such as a computing system. In FIG. 9A, an exemplary computing system 900 is a laptop computer. The laptop computer includes a display portion 905 and a corresponding second portion 910 that is flexibly coupled to the display portion 905. The laptop computer 900 may include, for example, an HDD 100 that is sealed using the FC 400. In another example, the laptop 900 includes an electrical, electro-mechanical, or electronic device coupled to a bulkhead interface that uses the FC 400 to provide a sealed electrical interface.

Figure 9B:
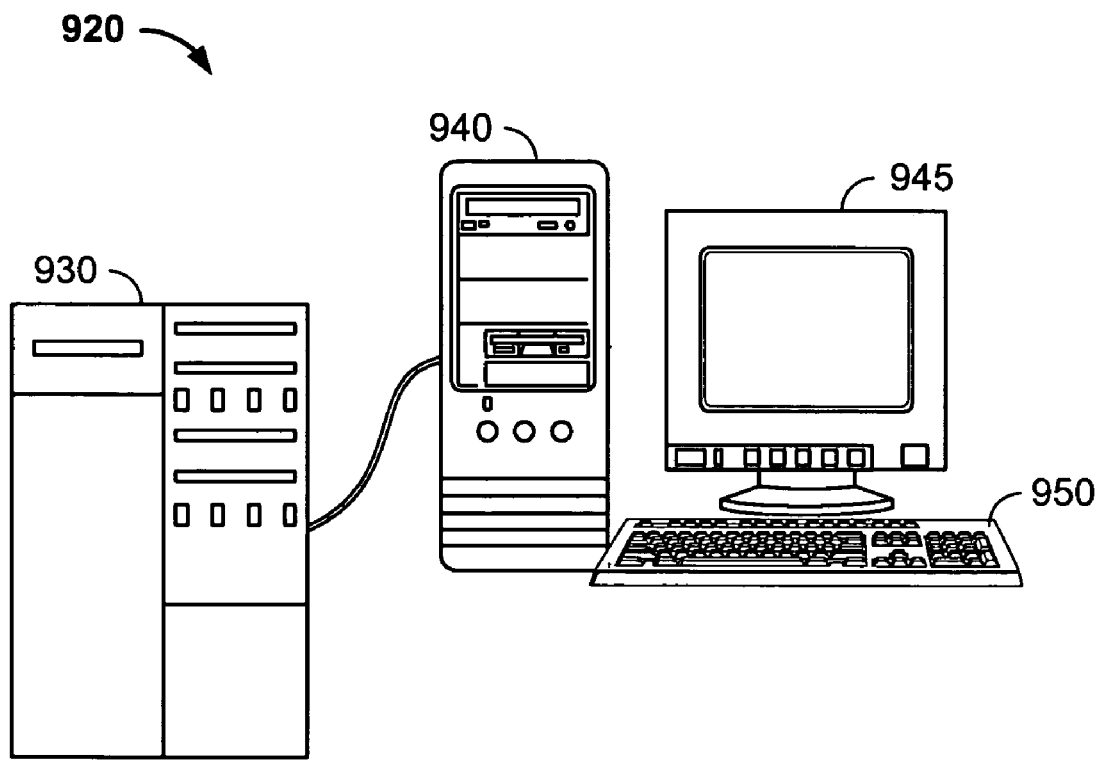

In FIG. 9B, another exemplary application is depicted as a computing system 920 in which a server 930 is coupled to a workstation 940. The workstation 940 is coupled to a display device 945 and a keyboard device 950. A user may use the keyboard 950 and the display device 945 to input and receive data to the workstation 940. The workstation 940 may be one of a number of workstations coupled to the server 930 in the system 920.

In one example, the server 930 includes an aperture that is sealed using the FC 400 to provide an electrical interface. In another example, the system 920 includes the server 930 and one or more workstations 940. In that example, each workstation 940 may be coupled to a display device 945 and a keyboard device 950, and use an FC 400 to provide a sealed electrical interface.

A number of embodiments have been described. Nevertheless, it will be understood that various modifications may be made. For example, high temperature ceramics may be used instead of LTCC ceramics to make a FC that is impermeable to helium. Surface-mount connectors may be used on both the interior facing and the exterior facing sides of the FC. Surface-mount style connectors may be used in various applications having hermetically sealed enclosures, such as, for example, an air-conditioning compressor or an electronic apparatus that has a controlled environment.

In one embodiment, the electrical connections to the spindle motor 106 may be made through a second flex assembly. In some examples, this second flex assembly may make electrical connection to a second bulkhead connector through a second aperture in the base 102. The second bulkhead connector may be, for example, a flat connector similar to FC 400. In one example, a bulkhead connector dedicated to interconnects for the spindle motor 106 may include three or four signal lines for operating and controlling the spindle motor 106.

Although certain examples described herein feature enclosures that are hermetically-sealed, other examples may apply to applications with reduced sealing specifications. For example, an electronic device may employ the FC to inhibit the ingress or egress of air or other gas. In another example, an electronic device may use the FC to control the ingress of contaminants, such as, dust, gasses, liquid water, water vapor, and the like.

Although some examples have been directed to applications involving hermetically-sealed enclosures, the FC may be used effectively to provide electrical connection through an aperture in an enclosure that is not hermetically sealed. For example, some applications may involve a controlled exchange of gasses between the interior of the enclosure and ambient atmosphere. By providing a sealed electrical interface, the enclosure may be configured to control the breathing (i.e. exchange of gasses) to selected locations to mitigate, for example, the negative impact of the breathing.

Various examples have been described generally as having an enclosure comprising a base portion and a cover. These examples are meant as merely illustrative. Sealed or partially sealed enclosures may comprise one or more components that, when assembled, define an enclosure for an electronic, electrical, mechanical, or electro-mechanical apparatus. A base portion as used herein may refer to any component of the enclosure having a wall in which electrical conductors may pass through an aperture. In general, various embodiments may be applied to seal such apertures. As such, the FC can be used to provide electrical connections to an apparatus within an enclosure without compromising the hermetic seal. As such, the FC provides a bulkhead electrical connector that has a low height profile and low cost without compromising the enclosure's ability to control of the ingress or egress of certain substances, whether in the form of a solid (e.g., dust), a liquid (e.g., water droplets), or a gas (e.g., helium).

The FC may be packaged and shipped either as an individual component, or as a sub-assembly in a kit that is combined with other components. For example, the FC may be packaged in combination with a connector that is soldered to one side of the FC. Alternatively, the FC may be packaged together with an internal wire harness sub-assembly, such as, for example, a flex circuit that may be readily installed into an HDD. As another example, an FC may be packaged in combination with any or all of the following as a kit: a connector, a wire harness sub-assembly, a flex spring, a clamp (flex bracket), mounting hardware (e.g. screws, retaining clips), and a base portion of an enclosure. The base portion of the enclosure may be pre-assembled with the FC already sealably attached over the bulkhead aperture, and any of an internal wire harness, a flex spring, or a clamp may be installed in the base. In addition, a connector, such as an external wiring harness or a surface mount connector, may be soldered to the exterior surface of the FC. In another example, any of the foregoing configurations may include a cover for the enclosure, and the cover may include mounting features (e.g. snap features) and/or mounting hardware. In an example specific to HDDs, a kit may include any of the foregoing, with any of an HDA, VCMA, spindle disk assembly, or environmental control module being installed within the base portion, and or a printed circuit board assembly (PCBA) being mounted external to the base. In the foregoing example, the FC may be electrically connected to the PCB assembly through, for example, the aforementioned external wiring harness or surface-mount connector.

Other examples may be used in a computer system to provide an environmental seal around conductors that pass through an aperture in an enclosure wall. For example, electrical signals may be passed through the wall of an enclosure containing, for example, a computer motherboard and associated components that are to be protected against the ingress of contaminants, such as dust and water. In some examples, a breather system may be included to provide for pressure equalization, and may be used in combination with desiccant and adsorbent systems. In one example, a computer system includes a helium-filled HDD that is hermetically sealed and uses an FC to pass electrical signals through a bulkhead aperture in the HDD enclosure.

In one example, after the cover 104 has been secured to the base 102, a source of helium (or another low density gas) may be connected to a valve (not shown) to fill the interior of the drive with a gas. Without being limiting, the gas could primarily be helium, but may be combined with or replaced by another suitable gas, such as another low density gas. The supply system may provide a method of evacuating the drive before filling the drive with the gas. For example, the enclosure may be filled with helium to a concentration of at least about 95 percent (at standard temperature and pressure). In such a system, an FC may provide a hermetically sealed electrical interface for passing conductors used to operate the HDD 100 in a helium-filled environment within the enclosure.

In accordance with the examples described herein, the storage device may be a magnetic disk storage device. However, other examples may include other types of disk storage devices, such as optical disks, and the like.

Accordingly, other embodiments are within the scope of the following claims.

What is claimed is:

1. A method of hermetically sealing an aperture in an enclosure, the method comprising:
    providing a base portion of the enclosure, the base portion having an aperture in a first wall; and
    mounting a flat connector (FC) to the first wall, the FC comprising:
        a first outer layer containing a first set of contacts;
        a second outer layer opposite the first outer layer and containing a second set of contacts, wherein at least one of the contacts in the first set of contacts is electrically connected to at least one contact in the second set of contacts through at least one electrically conductive path; and
        at least one substrate layer separating the first and second outer layers and containing a portion of each of the at least one conductive path.

2. The method of claim 1, wherein at least two of the layers of the FC provide a low permeability barrier to a gaseous medium.

3. The method of claim 2, wherein the gaseous medium comprises helium.

4. The method of claim 2, wherein the substrate layer comprises FR4 material and the first and second layers comprise a conductive metal substantially covering the area encompassed by the FC.

5. The method of claim 2, wherein the substrate layer comprises a ceramic material.

6. The method of claim 2, wherein the FC further comprises an optical path for coupling an optical signal through the FC.

7. The method of claim 2, wherein the enclosure comprises stainless steel.

8. The method of claim 2, wherein the enclosure comprises aluminum.

9. The method of claim 2, wherein mounting the FC comprises soldering a peripheral ring of exposed metal on one of the outer layers of the FC to the first wall of the enclosure.

10. The method of claim 9, wherein the FC is mounted on an interior surface of the first wall.

11. The method of claim 9, wherein the FC is mounted on an exterior surface of the first wall.

12. The method of claim 2, wherein the FC sealably encompasses the aperture to inhibit escape of the gaseous medium from within the enclosure to an external ambient environment.

13. The method of claim 2, wherein mounting the FC comprises adhesively bonding to the periphery of the FC, wherein the bonding adhesive has a low permeability to the gaseous medium.

14. The method of claim 1, wherein the FC further comprises a first internal conductive layer disposed between two substrate layers, the first internal conductive layer including interconnections between a first set of vias that are electrically coupled to the first set of contacts and a second set of vias that are electrically coupled to the second set of contacts.

15. A method of making electrical connection through an aperture in a wall, the method comprising:
    providing a flat connector (FC) comprising:
        a first outer layer containing a first set of contacts;
        a second outer layer opposite the first outer layer and containing a second set of contacts, wherein at least one of the contacts in the first set of contacts is electrically coupled to at least one contact in the second set of contacts through at least one electrically conductive path; and
        at least two substrate layer separating the first and second outer layers and containing a portion of each of the at least one conductive path;
        a first internal conductive layer disposed between two substrate layers, the first internal conductive layer including interconnections between a first set of vias that are electrically coupled to the first set of contacts and a second set of vias that are electrically coupled to the second set of contacts; and
    sealably attaching the FC to the wall such that the FC sealably encompasses the aperture in the wall.

16. The method of claim 15, wherein mounting the FC comprises soldering a peripheral ring of exposed metal on one of the outer layers of the FC to the wall.

17. The method of claim 15, wherein mounting the FC comprises adhesively bonding to the periphery of the FC, wherein the bonding adhesive has a low permeability to helium.

* * * * *